US012160008B1

(12) United States Patent
Liang

(10) Patent No.: US 12,160,008 B1
(45) Date of Patent: Dec. 3, 2024

(54) LOWER PLASTIC PART, END COVER ASSEMBLY, ENERGY STORAGE DEVICE AND ELECTRICAL EQUIPMENT

(71) Applicant: Xiamen Hithium Energy Storage Technology Co., Ltd., Fujian (CN)

(72) Inventor: Jinyun Liang, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/766,166

(22) Filed: Jul. 8, 2024

(30) Foreign Application Priority Data

Sep. 13, 2023 (CN) .......................... 202311176612.1

(51) Int. Cl.
*H01M 50/15* (2021.01)
*H01M 50/133* (2021.01)
*H01M 50/143* (2021.01)
*H01M 50/16* (2021.01)
*H01M 50/70* (2021.01)

(52) U.S. Cl.
CPC ......... *H01M 50/15* (2021.01); *H01M 50/133* (2021.01); *H01M 50/143* (2021.01); *H01M 50/16* (2021.01); *H01M 50/70* (2021.01)

(58) Field of Classification Search
CPC .. H01M 50/15; H01M 50/143; H01M 50/133; H01M 50/70; H01M 50/16
See application file for complete search history.

(56) References Cited

FOREIGN PATENT DOCUMENTS

| CN | 208690318 U | 4/2019 |
| CN | 212764509 U | 3/2021 |
| CN | 116365122 A | 6/2023 |
| CN | 116365123 A | 6/2023 |
| CN | 116365129 A | 6/2023 |
| CN | 116387711 A | 7/2023 |
| CN | 116470197 A | 7/2023 |
| CN | 116581495 A | 8/2023 |
| WO | 2020063584 A1 | 4/2020 |

OTHER PUBLICATIONS

CNIPA, International Search Report for International Patent Application No. PCT/CN2024/076353, May 16, 2024, 6 pages.
CNIPA, Written Opinion for International Patent Application No. PCT/CN2024/076353, May 16, 2024, 8 pages.
CNIPA, Notification to Grant for corresponding Chinese Patent Application No. 202311176612.1, Oct. 26, 2023, 10 pages.

*Primary Examiner* — Jane J Rhee
(74) *Attorney, Agent, or Firm* — IP Spring

(57) ABSTRACT

The present disclosure provides a lower plastic part, an end cover assembly, an energy storage device, and electrical equipment. The lower plastic part has a first surface and a second surface opposite to the first surface. The lower plastic part defines a groove, a stream guidance hole, and a concave portion. The groove and the concave portion are located at opposite ends of the lower plastic part in its length direction. The stream guidance hole penetrates through a bottom wall of the groove. A hole diameter of the stream guidance hole is progressively smaller. The lower plastic part further comprises a plurality of first ejector pin parts, a plurality of second ejector pin parts, and a plurality of third ejector pin parts which are symmetrical with respect to a center line of the lower plastic part in a width direction.

20 Claims, 8 Drawing Sheets

LOWER PLASTIC PART, END COVER ASSEMBLY, ENERGY STORAGE DEVICE AND ELECTRICAL EQUIPMENT

CROSS-REFERENCE TO RELATED APPLICATIONS

The present disclosure claims priority benefits under 35 U.S.C. 119 (a) to Chinese Patent Application No. 202311176612.1, filed Sep. 13, 2023, the contents of which are incorporated herein by reference.

TECHNICAL FIELD

The present disclosure relates to a field of energy storage technology, and in particular to a lower plastic part, an end cover assembly, an energy storage device, and electrical equipment.

BACKGROUND

A secondary battery (Rechargeable battery), also known as a rechargeable battery or a storage battery, is a battery having active materials that can be activated by charging and continued to be used after the battery is discharged. The recyclable characteristics of the secondary battery make it gradually become the main power source of electrical equipment. With the gradual increase in the demand for the secondary battery, people have higher and higher performance requirements in all aspects, especially for a battery energy density per volume, and the thickness of an end cover assembly of the battery is an important parameter that affects the battery energy density per volume. The current end cover assembly includes a lower plastic part used for insulation between a top cover and poles. The lower plastic part is usually designed to be very thin in order to improve the battery energy density per volume of the battery. The lower plastic part is often molded by injection molding.

SUMMARY

In a first aspect, the present disclosure provides a lower plastic part. The lower plastic part includes a first surface and a second surface. The first surface is disposed facing away from the second surface along a thickness direction of the lower plastic part. The lower plastic part defines a groove, a stream guidance hole, a concave portion, a plurality of first ejector pin parts, a plurality of second ejector pin parts and a plurality of third ejector pin parts. The groove is defined at one end of the lower plastic part along a length direction of the lower plastic part. A bottom wall surface of the groove protrudes from the second surface, and an opening of the groove is disposed in the first surface. The stream guidance hole penetrates through a bottom wall of the groove. A hole diameter of the stream guidance hole is progressively smaller along a direction from the first surface to the second surface. The concave portion is defined at the other end of the lower plastic part along the length direction of the lower plastic part. A bottom wall surface of the concave portion protrudes from the second surface, and an opening of the groove is disposed in the first surface. The plurality of the first ejector pin parts are disposed on the first surface, located between the groove and the concave portion, and spaced apart from each other. The plurality of the second ejector pin parts are disposed on the bottom wall surface of the concave portion, and spaced apart from each other. The plurality of the third ejector pin parts are disposed on the bottom wall surface of the groove, and spaced apart from each other. The plurality of the first ejector pin parts, the plurality of the second ejector pin parts and the plurality of the third ejector pin parts are all symmetrical with respect to a center line of the lower plastic part in a width direction.

In one possible embodiment, the lower plastic part further includes a third surface. The third surface is located at one end of the second surface along the length direction of the lower plastic part. The third surface is located at one side of the groove facing away from the first surface along the thickness direction of the lower plastic part. An orthographic projection of the groove on the third surface is located within the third surface. The lower plastic part also includes a first injection molding part. The first injection molding part includes a first opening end. The first opening end is disposed in the third surface.

In one possible embodiment, the lower plastic part further includes a fourth surface. The fourth surface is located at one end of the second surface away from the third surface along the length direction of the lower plastic part. The fourth surface is located at one side of the concave portion facing away from the first surface along the thickness direction of the lower plastic part, and an orthographic projection of the concave portion on the fourth surface is located within the fourth surface. The lower plastic part further includes a second injection molding part. The second injection molding part includes a second opening end. The second opening end is disposed in the fourth surface.

In a second aspect, the present disclosure provides an end cover assembly including an end cover, an explosion-proof valve and a lower plastic part as described above. Along the thickness direction of the end cover assembly, the lower plastic part is laminated on one side of the end cover, and the first surface of the lower plastic part faces the end cover. Along the thickness direction of the end cover assembly, the explosion-proof valve is opposite to a bottom wall of the concave portion.

In a third aspect, the present disclosure provides an energy storage device including a housing, an electrode assembly and an end cover assembly as described above. The housing defines an opening. The housing defines an accommodating space. The electrode assembly is received in the accommodating space. The end cover assembly is mounted to the housing and covers the opening.

In a fourth aspect, the present disclosure provides electrical equipment including an energy storage device as described above. The energy storage device is configured to store electrical energy.

BRIEF DESCRIPTION OF THE ACCOMPANYING DRAWINGS

In order to more clearly illustrate the technical solutions in the embodiments of the present disclosure, a brief description of the accompanying drawings to be used in the embodiments will be given below. Obviously, for a person of ordinary skill in the art, the accompanying drawings in the following description are only some embodiments of the present disclosure, and other accompanying drawings can be obtained on the basis of these drawings without any creative work.

Figure 1:
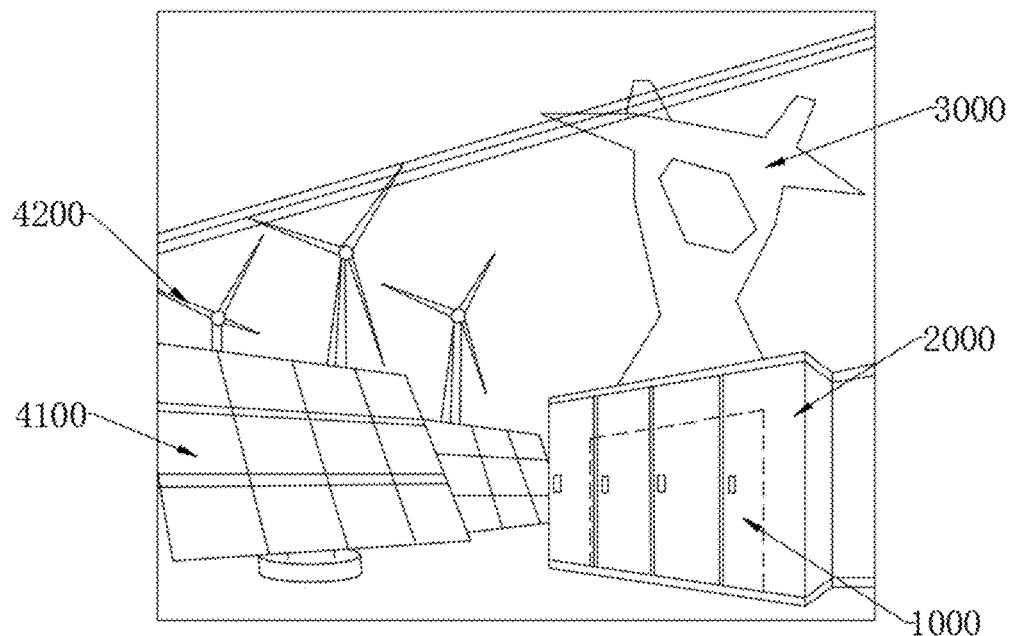
FIG. 1 illustrates a view of an application scenario of an energy storage device in accordance with an embodiment of the present disclosure.

THE DESCRIPTION OF REFERENCE SIGNS 5000-energy storage system; 4100-first electrical energy conversion device; 4200-second electrical energy conversion device; 3000-first electrical equipment; 2000-second electrical equipment; 1000-energy storage device; 200-electrode assembly; 100-end cover assembly; 30-lower plastic part; 40-end cover; 70-explosion-proof valve; 50-upper plastic assembly; 60-electrode pole; 61-first pole; 62-second pole; 51-first upper plastic part; 52-second upper plastic part; 41-end covermain part; 411-first through hole; 412-second through hole; 413-fluid filling hole; 414-weld groove; 10-first lower plastic part; 20-second lower plastic part; 11-main part; 14-protruding platform; 15-protrusion; 111-main surface; 112-second surface; 12-retaining protrusion; 113-pole through hole; 141-fourth surface; 142-protruding platform surface; 13-concave portion; 131-first bottom wall; 132-first sidewall; 133-second sidewall; 1311-first sub-bottom wall; 1312-second sub-bottom wall; 1411-first sub-surface; 1412-second sub-surface; 1316-through groove; 1316a-first wall; 1316b-second wall; 1313-first strip reinforcement; 1314-second strip reinforcement; 1315-airflow hole; 151-third surface; 152-protrusion surface; 101-first surface; 102-lower plastic part surface; 153-block; 154-side block; 16-groove; 161-second bottom wall; 162-first groove sidewall; 163-second groove sidewall; 164-strengthening rib; 165-stream guidance slot; 166-stream guidance hole; 17-first injection molding part; 171-first opening end; 172-first injection molding protrusion; 18-second injection molding part; 181-second opening end; 182-second injection molding protrusion; 191-first anti-overflow groove; 192-second anti-overflow groove; S1-first ejector pin part; S2-second ejector pin part; S3-third ejector pin part.

DETAILED DESCRIPTION OF ILLUSTRATED EMBODIMENTS

The technical solutions in the embodiments of the present disclosure will be clearly and completely described below with reference to the accompanying drawings in the embodiments of the present disclosure. Obviously, the embodiments described are only a part of the embodiments of the present disclosure, and not all of them. Based on the embodiments in the present disclosure, all other embodiments obtained without creative work by a person of ordinary skill in the art shall fall within a protection scope of the present disclosure.

Since the energy people need is highly temporal and spatial, in order to rationally utilize energy and improve energy utilization, it is necessary to store a form of energy in the same or converted into another form of energy through a medium or device, and then release it in a specific form of energy based on future application needs. As we all know, in order to realize a big goal of carbon neutrality, the main way to generate green electricity is to develop green energy such as photovoltaic and wind power, etc., to replace fossil energy. At present, the generation of green electricity generally relies on photovoltaic, wind power, water potential, etc. However, wind energy and solar energy, etc., are generally highly intermittent and volatile, which can cause grid instability, not enough electricity for peak consumption, too much electricity for trough consumption, and unstable voltage will also cause damage to the electric power, and therefore may be due to insufficient demand for electricity or insufficient acceptance of the grid capacity, triggering the problem of "wind and light discard", to solve these problems must rely on energy storage. That is, electrical energy is converted into other forms of energy by physical or chemical means for storage, in the time of need will be converted to electrical energy for release, in simple terms, energy storage is similar to a large "charging treasure", when the photovoltaic or wind energy is sufficient, the electrical energy will be stored, in the need to release the power of the energy storage.

Taking electrochemical energy storage as an example, the present disclosure provides an energy storage device 1000. The energy storage device 1000 is equipped with a group of chemical batteries, mainly the use of chemical batteries within the chemical elements to do the energy storage medium, charging and discharging process accompanied by the chemical reaction or change of the energy storage medium, in short, the electrical energy from wind and solar energy is stored in chemical batteries, and then the stored electrical energy is released for use when the use of external electricity reaches its peak, or transferred to the place where electrical energy is in short supply for further use.

The current application scenarios of energy storage (i.e., energy storing) are more extensive, including (wind and solar) power generation side energy storage, grid side energy storage, base station side energy storage and user side energy storage, etc., the corresponding types of energy storage device 1000 include:

(1) Large-sized energy storage containers applied in grid-side energy storage scenarios, which can be used as a high-quality active and reactive power regulating power source in the power grid to realize the load matching of electric energy in time and space, enhance the capacity of renewable energy consumption, and are of great significance in the backup of the power grid system, alleviation of the pressure on the supply of power to the peak loads, and peak frequency regulation;

(2) Small-sized and medium-sized energy storage cabinets applied in user-side industrial and commercial energy storage scenarios (banks, shopping malls, etc.), with a main operation mode of "peak shaving and valley filling". Due to the large price difference in electricity charges in the peak and valley locations according to the demand for electricity, users with energy storage equipment, in order to reduce costs, usually charging energy storage cabinets/boxes in the low price of electricity, and then releasing the electricity in the energy storage equipment for use in the peak price of electricity, to achieve the purpose of saving electricity charges.

It is to be noted that the above-mentioned energy storage container, small and medium-sized energy storage electrical cabinets, household small energy storage box, and other equipment including the energy storage device 1000 can be understood to be electrical equipment.

Referring to FIG. 1, FIG. 1 illustrates a view of an application scenario of an energy storage device in accordance with an embodiment of the present disclosure. The energy storage device 1000 provided by embodiments of the present disclosure is applied to an energy storage system 5000. The energy storage system 5000 includes a first electrical energy conversion device 4100 (photovoltaic panels), a second electrical energy conversion device 4200 (wind turbine), a first electrical equipment 3000 (power grid), a second electrical equipment 2000 (base station), and an energy storage device 1000. The energy storage system 5000 further includes an energy storage cabinet. The energy storage device 1000 is mounted within the energy storage cabinet. The energy storage cabinet may be installed outdoors. Specifically, the first electrical energy conversion device 4100 converts solar energy into electrical energy during periods of low price of electricity, and the energy storage device 1000 is configured to store the electrical energy and supply it to the first electrical equipment 3000 or the second electrical equipment 3000 during periods of peak electricity consumption, or to supply power when the first electrical equipment 3000 or the second electrical equipment 2000 is disconnected/out of power. The second electrical energy conversion device 4200 can convert wind energy into electrical energy, and the energy storage device 1000 is used to store the electrical energy and supply it to the first electrical equipment 3000 or the second electrical equipment 2000 at peak times, or in the event of a power failure/outage of the first electrical equipment 3000 or the second electrical equipment 2000. The transmission of the electrical energy may be carried out using a high voltage cable.

It should be noted that the above-mentioned first electrical equipment 3000, second electrical equipment 2000, and other equipment containing the energy storage device 1000 can be understood as the electrical equipment.

The quantity of energy storage devices 1000 may be several, and the several energy storage devices 1000 are connected in series or in parallel with each other. In this embodiment, "several" means two or more.

It can be understood that the energy storage device 1000 may include, but is not limited to, a single battery, a battery module, a battery pack, a battery system, and the like. The actual application forms of the energy storage device 1000 provided by the embodiments of the present disclosure may be, but are not limited to, the listed products, and may also be other application forms, and the embodiments of the present disclosure do not strictly limit the application forms of the energy storage device 1000. The embodiments of the present disclosure are only illustrated by taking the energy storage device 1000 as an example of a multi-cell battery.

Figure 2:
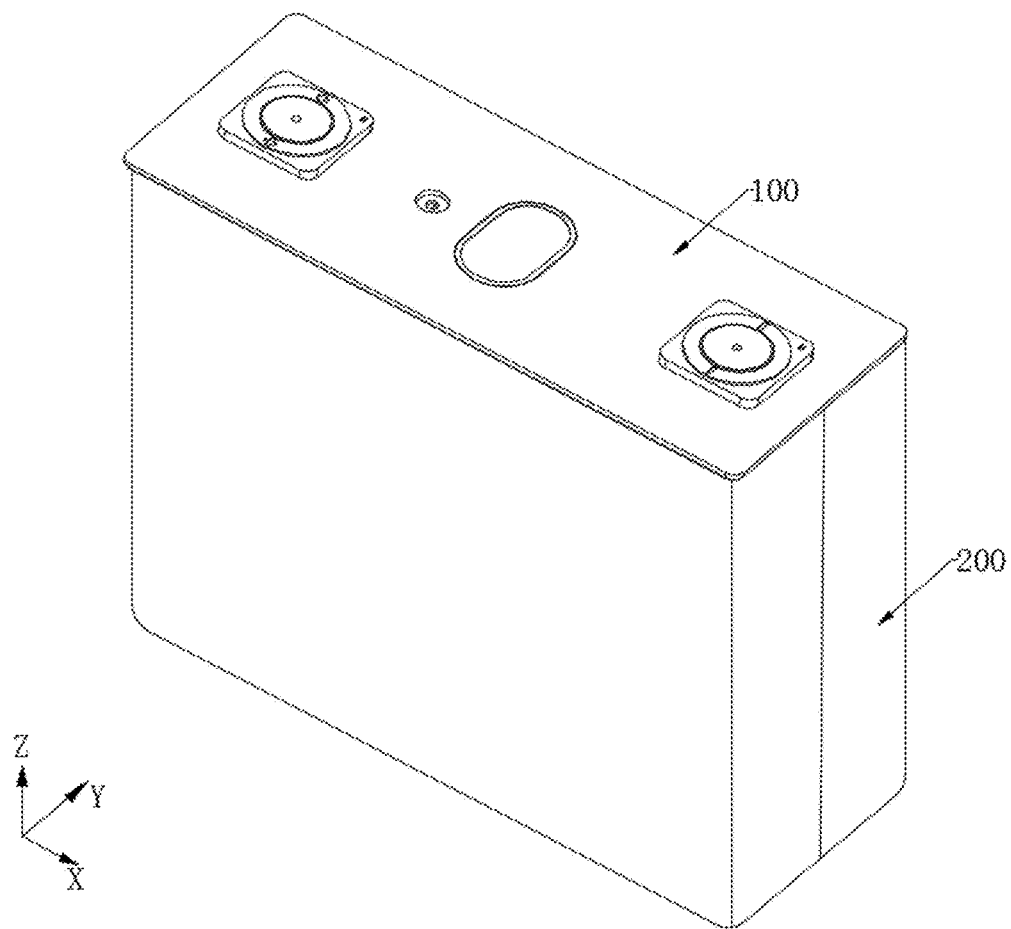
FIG. 2 illustrates a structural view of the energy storage device shown in FIG. 1.

Referring to FIG. 2, FIG. 2 illustrates a structural view of the energy storage device shown in FIG. 1. The energy storage device 1000 includes a housing (not shown), an end cover assembly 100, and an electrode assembly 200. The housing defines an opening. The housing defines an accommodating space. The electrode assembly 200 is received within the accommodating space. The end cover assembly 100 covers the opening. The housing wraps around and underneath the electrode assembly 200. The housing is hermetically connected to the end cover assembly 100. The electrode assembly 200 includes at least two pole cores. The pole core includes a pole core main part and pole lugs. The pole lugs are connected to the pole core main part.

For convenience of description, a length direction of the end cover assembly shown in FIG. 2 is defined as an X-axis direction, a width direction of the end cover assembly is defined as a Y-axis direction, and a thickness direction of the end cover assembly is defined as a Z-axis direction, with the X-axis direction, the Y-axis direction, and the Z-axis direction being two mutually perpendicular. The description of the embodiments of the present disclosure refers to "up", "down", and other orientation terms based on the orientation shown in FIG. 2 of the accompanying specification, and a positive direction of the Z-axis direction is referred to as "up", and a negative direction of the Z-axis direction is referred to as "down", which does not limit the application of the energy storage device in the actual application scenarios. The terms "same", "equal", or "parallel" as used hereinafter allow for certain tolerances.

Figure 3:
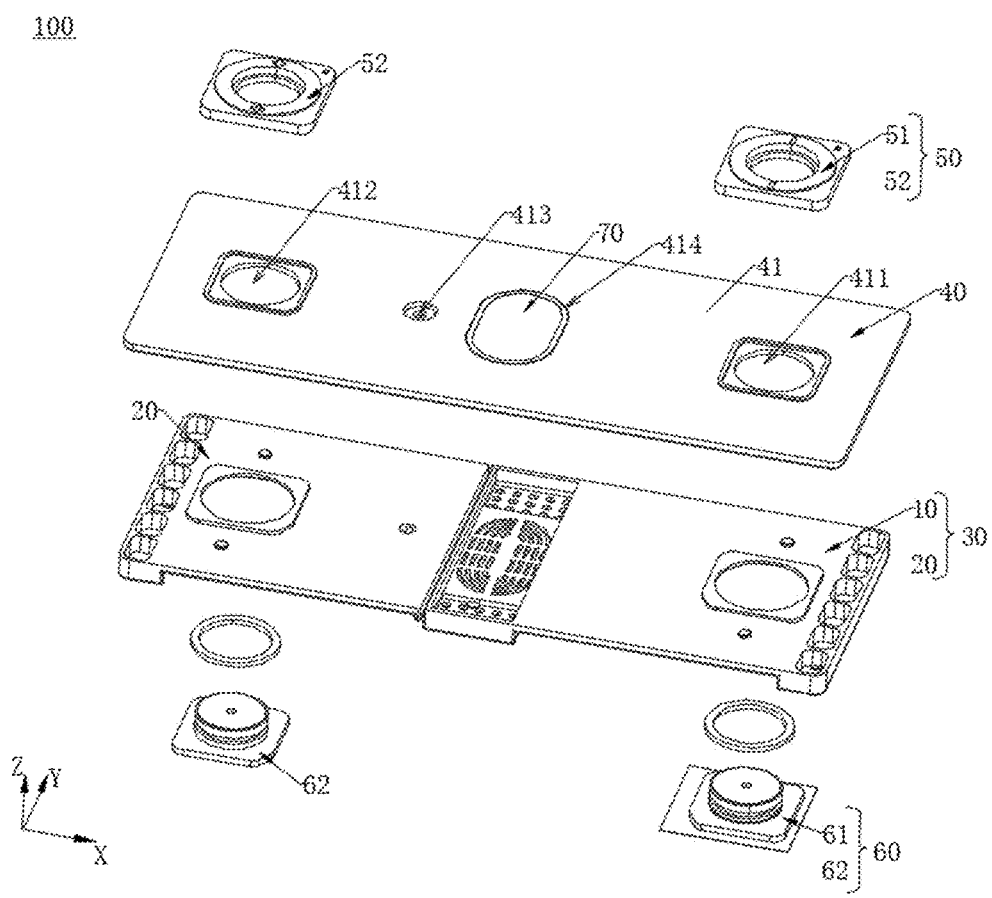
FIG. 3 illustrates an exploded view of an end cover assembly of the energy storage device shown in FIG. 2.

Referring to FIG. 3, FIG. 3 illustrates an exploded view of an end cover assembly of the energy storage device shown in FIG. 2. The end cover assembly 100 includes a lower plastic part 30 and an end cover 40. The lower plastic part 30 is mounted on the end cover 40. The end cover 40 in this embodiment is a bare aluminium part, and the lower plastic part 30 is made of plastic materials and insulated. The end cover assembly 100 further includes an explosion-proof valve 70. The explosion-proof valve 70 is mounted on the end cover 40. The end cover assembly 100 further includes an upper plastic assembly 50 and an electrode pole 60. Specifically, the end cover 40 is stacked on the lower plastic part 30. The lower plastic part 30 is configured to insulate the end cover 40 from the electrode assembly 200. The upper plastic assembly 50 is stacked on the end cover 40. The upper plastic assembly 50 is located at one side of the end cover 40 away from the lower plastic part 30. The electrode pole 60 includes a first pole 61 and a second pole 62. The upper plastic assembly 50 includes a first upper plastic part 51 and a second upper plastic part 52. The first upper plastic part 51 and the second upper plastic part 52 are mounted side by side at both ends of the end cover 40 along the length direction (X-axis direction) of the end cover assembly 100. The first upper plastic part 51 and the second upper plastic part 52 are both defined with a through hole for the first pole 61 and the second pole 62 respectively to pass through. The first pole 61 and the second pole 62 each is sleeved with a scaling ring. It should be noted that in this embodiment, the first pole 61 is a negative pole and the second pole 62 is a positive pole. In other embodiments, it is also possible that first pole 61 is a positive pole and the second pole 42 is a negative pole.

In this embodiment, the end cover 40 includes an end cover main part 41. The end cover main part 41 defines a first through hole 411, a weld groove 414, a second through hole 412, and a fluid filling hole 413. Along the length direction (X-axis direction) of the end cover 40, the first through hole 411, the weld groove 414, the fluid filling hole 413, and the second through hole 412 are spaced apart sequentially.

The first through hole 411 and the second through hole 412 are disposed at opposite ends of the end cover main part 41, respectively. In this embodiment, the first through hole 411 and the second through hole 412 are configured for the first pole 61 and the second pole 62 of the energy storage device 1000 to pass through, respectively. In other embodiments, the first through hole 411 may also be configured for passage of the second pole 62, and the second through hole 412 may also be configured for passage of the first pole 61.

The explosion-proof valve 70 is welded to a groove wall of the weld groove 414. When the pressure inside the energy storage device 1000 is too high, the explosion-proof valve 70 automatically opens to leak pressure to prevent an explosion. The fluid filling hole 413 is disposed between the weld groove 414 and the second through hole 412. The electrolyte is injected into the energy storage device 1000 through the fluid filling hole 413 on the end cover 40 during a fluid filling process of the energy storage device 1000.

Referring back to FIG. 3, the lower plastic part 30 includes a first lower plastic part 10 and a second lower plastic part 20. The end cover 40 is stacked on both the first lower plastic part 10 and the second lower plastic part 20. The first lower plastic part 10 and the second lower plastic part 20 are butted along the length direction of end cover 40. A sum of the lengths of the first lower plastic part 10 and the second lower plastic part 20 is less than or equal to a length of the end cover 40; and the width of both the first lower plastic part 10 and the second lower plastic part 20 is the same as the width of the end cover 40, therein a certain tolerance range is allowed.

The embodiments of the present disclosure are illustrated with the first lower plastic part 10 as an example, and it should be understood that the second lower plastic part 20 can also be referred to.

Figure 4:
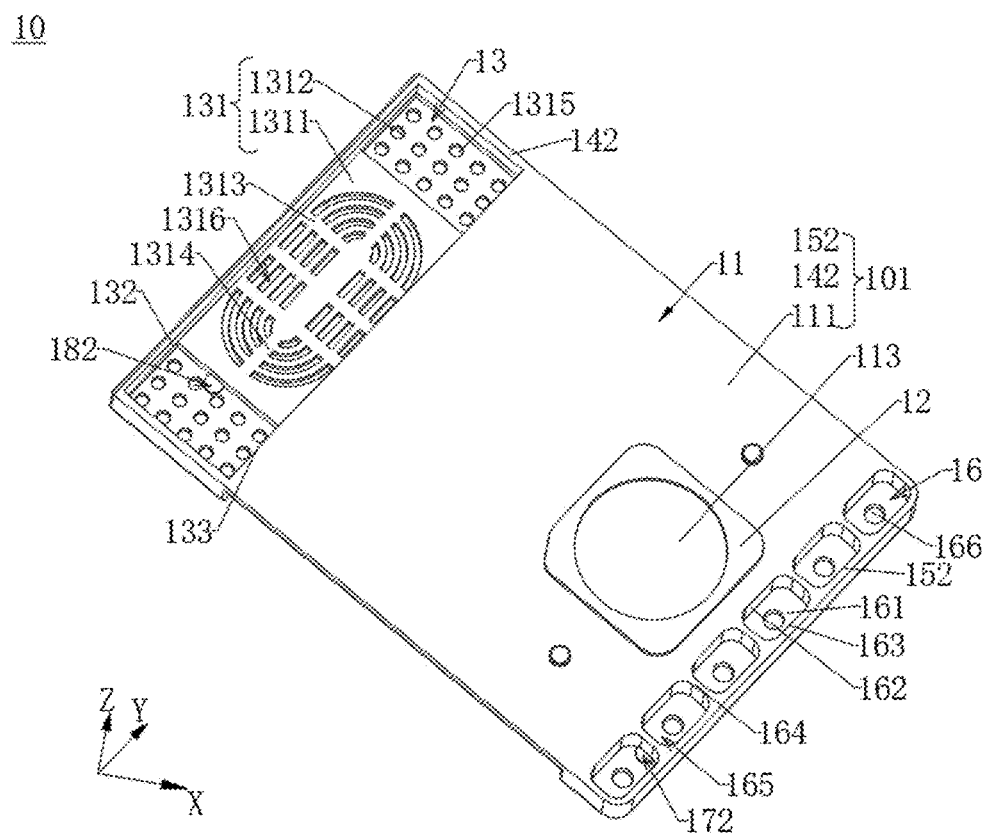
FIG. 4 illustrates a structural view of a first lower plastic part shown in FIG. 3.
Figure 5:
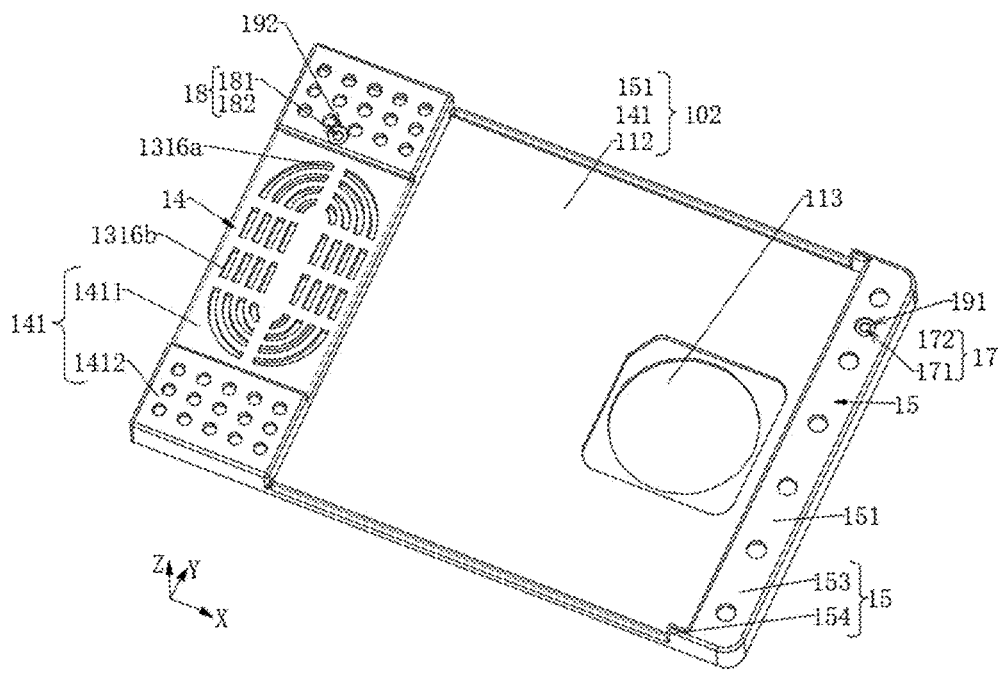
FIG. 5 illustrates a structural view of the first lower plastic part shown in FIG. 4 at a second angle.

Referring to FIGS. 4 and 5 together, FIG. 4 illustrates a structural view of a first lower plastic part shown in FIG. 3; FIG. 5 illustrates a structural view of the first lower plastic part shown in FIG. 4 at a second angle.

In this embodiment, the first lower plastic part 10 includes a main part 11, a protruding platform 14 and a protrusion 15. Along the length direction (X-axis direction) of the first lower plastic part 10, the protruding platform 14 and the protrusion 15 are connected to the two opposite ends of the main part 11. The main part 11 is substantially a rectangular metal sheet including a main surface 111 and a second surface 112. Along the thickness direction (Z-axis direction) of the first lower plastic part 10, the main surface 111 is opposite to the second surface 112. The main part 11 includes a retaining protrusion 12. Specifically, the retaining protrusion 12 protrudes from the main surface 111 of the main part 11 and is located at one end of the main part 11 along the length direction (X-axis direction) of the first lower plastic part 10.

In this embodiment, the main part 11 defines a pole through hole 113. The pole through hole 113 is a circular through hole. The pole through hole 113 penetrates through the main surface 111 and the second surface 112. The pole through hole 113 is located in the retaining protrusion 12. The pole through hole 113 is configured for passage of the first pole 61. In other embodiments, the pole through hole 113 may also be used for passage of the second pole 62.

In this embodiment, the protruding platform 14 is located at one end of the main part 11 away from the retaining protrusion 12. The protruding platform 14 includes a fourth surface 141 and a protruding platform surface 142. Along the thickness direction (Z-axis direction) of the first lower plastic part 10, the fourth surface 141 is disposed facing away from the protruding platform surface 142. The protruding platform surface 142 is flush with the main surface 111 of the main part 11. The fourth surface 141 is located away from the main surface 111 compared to the second surface 112; i.e., the fourth surface 141 protrudes from the second surface 112. It can be understood that the height of the protruding platform 14 is greater than the thickness of the main part 11.

The protruding platform 14 defines a concave portion 13 therein. The concave portion 13 is formed by recessing the protruding platform surface 142 towards the fourth surface 141, along the thickness direction (Z-axis direction) of the first lower plastic part 10, an orthographic projection of the concave portion 13 on the fourth surface 141 is located within the fourth surface 141. A depth of the concave portion 13 is greater than a depth between the main surface 111 and the second surface 112 of first lower plastic part 10. The concave portion 13 includes a first bottom wall 131, and a first sidewall 132 and a second sidewall 133 disposed opposite to each other along the length direction (X-axis direction) of the first lower plastic part 10. A surface of the first bottom wall 131 facing an interior of the concave portion 13 is a bottom wall surface of the concave portion 13. The concave portion 13 further includes two end walls disposed opposite to each other along the width direction (Y-axis direction) of the first lower plastic part 10. The first bottom wall 131 includes a first sub-bottom wall 1311 and two second sub-bottom walls 1312. Along the width direction (Y-axis direction) of the first lower plastic part 10, the two second sub-bottom walls 1312 are disposed on opposite sides of the first sub-bottom wall 1311, and the first sub-bottom wall 1311 is connected to the two end walls via the two second sub-bottom walls 1312, respectively. Along the thickness direction (Z-axis direction) of the first lower plastic part 10, the two second sub-bottom walls 1312 have a height difference from the first sub-bottom wall 1311, and the two second sub-bottom walls 1312 are located away from the second surface 112 of the main part 11 with respect to the first sub-bottom wall 1311; it can be understood that there are two steps formed between the first sub-bottom wall 1311 and the two second sub-bottom walls 1312.

The fourth surface 141 includes a first sub-surface 1411 and two second sub-surfaces 1412. The first sub-surface 1411 corresponds to the first sub-bottom wall 1311 in the thickness direction (Z-axis direction) of the first lower plastic part 10, and an orthographic projection of the first sub-bottom wall 1311 on the first sub-surface 1411 is located within the first sub-surface 1411. The two second sub-surfaces 1412 correspond to the two second sub-bottom walls 1312 in the thickness direction (Z-axis direction) of the first lower plastic part 10, respectively. An orthographic projection of one second sub-bottom wall 1312 on the one second sub-surface 1412 is located within the one second sub-surface 1412, and an orthographic projection of another second sub-bottom wall 1312 on the another second sub-surface 1412 is located within the another second sub-surface 1412. The two second sub-surfaces 1412 are located away from the second surface 112 of the main part 11 compared to the first sub-surface 1411, and the two second sub-surfaces have a height difference from the first sub-surface 1411.

The first sub-bottom wall 1311 defines a through groove 1316. Along the thickness direction (Z-axis direction) of the first lower plastic part 10, the through groove 1316 penetrates through two faces of the first sub-bottom wall 1311 that are set facing away from each other along the thickness direction. The through groove 1316 has two first walls 1316a and two second walls 1316b. The two first walls 1316a are curved and the two first walls 1316a are disposed opposite to each other along the width direction (Y-axis direction) of the first lower plastic part 10. The two second walls 1316b are connected between the two first walls 1316*a*, and the two second walls 1316*b* are disposed opposite to each other along the length direction (X-axis direction) of the first lower plastic part 10. It can be understood that the through groove 1316 has an overall "elliptical runway" shape.

The through groove 1316 is provided with a plurality of first strip reinforcements 1313 and a second strip reinforcement 1314. The plurality of the first strip reinforcements 1313 are disposed side-by-side and spaced apart along the width direction (Y-axis direction) of the first lower plastic part 10, and each first strip reinforcement 1313 connects the two second walls 1316*b* of the through groove 1316 opposite to each other in the length direction (X-axis direction) of the first lower plastic part 10. The second strip reinforcement 1314 penetrates through the plurality of the first strip reinforcements 1313 along the width direction (Y-axis direction) of the first lower plastic part 10 and connects the two first walls 1316*a* of the through groove 1316 opposite to each other in the width direction (Y-axis direction) of the first lower plastic part 10. It can be understood that the plurality of the first strip reinforcements 1313 and the second strip reinforcement 1314 cooperatively form a plurality of sub-through grooves within the through groove 1316. In this embodiment, the quantity of the second strip reinforcement 1314 is one, and in other embodiments, the quantity of the second strip reinforcement 1314 may also be two or more.

Each second sub-bottom wall 1312 defines a plurality of airflow holes 1315. Along the thickness direction (Z-axis direction) of the first lower plastic part 10, the airflow hole 1315 penetrates through both faces of the second sub-bottom wall 1312 set back to back, and the airflow holes 1315 are arranged in a matrix. The airflow hole 1315 of this embodiment is a circular hole, but of course, it can be a through hole of other shapes.

Figure 6:
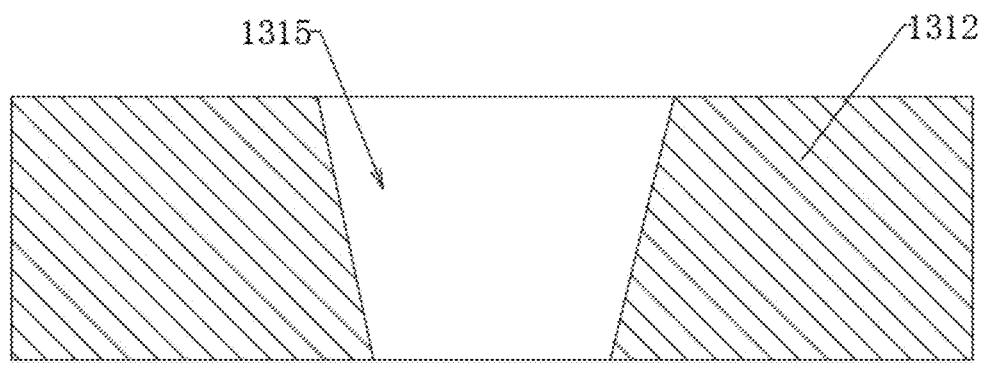
FIG. 6 illustrates a cross-sectional view of an airflow hole shown in FIG. 4.

Referring to FIG. 6, FIG. 6 illustrates a cross-sectional view of an airflow hole shown in FIG. 4. In this embodiment, a hole wall of the airflow hole 1315 is set to be inclined, and a hole diameter of the airflow hole 1315 becomes progressively smaller along a direction from the main surface 111 to the second surface 112, i.e., the hole wall of the airflow hole 1315 is inclined to form a guiding inclined plane.

It can be understood that the first bottom wall 131, the plurality of the first strip reinforcement 1313, the second strip reinforcement 1314, and the plurality of the airflow holes 1315 cooperatively form an explosion-proof fence. The explosion-proof fence is opposite the explosion-proof valve 70.

It can be understood that in this embodiment, the hole wall of the airflow hole 1315 form the guiding inclined plane, when the energy storage device 1000 is shaken or inverted, etc., the electrolyte is caused to splash onto the two second sub-bottom walls 1312 of the concave portions 13 of the first lower plastic part 10, or the electrolyte is caused to splash onto the main surface 111 and then flow onto the two second sub-bottom walls 1312, the electrolyte can quickly flow back into the electrode assembly 200 under the guidance of the guiding inclined plane of the airflow hole 1315, improving a wettability of the electrode assembly 200, and avoiding the electrolyte staying in the main surface 111 or the two second sub-bottom walls 1312 of the first lower plastic part 10, which cannot participate in the electrochemical reaction, resulting in a waste of the electrolyte.

In addition, the injection mold of the lower plastic part 30 is conical convex column at a position corresponding to the airflow hole 1315, so that when the lower plastic part 30 is demolding from the injection mold, the conical convex column is separated in a direction away from the lower plastic part 30, and an outer peripheral surface of the conical convex column can be separated from the hole wall of the airflow hole 1315 of the lower plastic part 30 in a split second, so as to avoid the conical convex column from contacting with the hole wall of the airflow hole 1315 during a process of withdrawing from the airflow hole 1315, resulting in a pulling of the lower plastic part 30, and therefore, the yield of injection molding of the lower plastic part 30 is improved, and the production cost is reduced.

Referring back to FIGS. 4 and 5, in this embodiment, the protrusion 15 is located at one end of the main part 11 close to the retaining protrusion 12. The protrusion 15 includes a third surface 151 and a protrusion surface 152. Along the thickness direction (Z-axis direction) of the first lower plastic part 10, the third surface 151 is set opposite to the protrusion surface 152. The protrusion surface 152 is flush with the main surface 111 of the main part 11. The third surface 151 is located away from the main surface 111 as compared to the second surface 112, i.e., the third surface 151 protrudes from the second surface 112. It can be understood that the height of the protrusion 15 is greater than the thickness of the main part 11. Along the thickness direction (Z-axis direction) of the first lower plastic part 10, the third surface 151 is flush with the fourth surface 141.

The fourth surface 141 of the protruding platform 14, the second surface 112 of the main part 11, and the third surface 151 of the protrusion 15 cooperatively form a lower plastic part surface 102 of the first lower plastic part 10. The protruding platform surface 142 of the protruding platform 14, the main surface 111 of the main part 11, and the protrusion surface 152 of the protrusion 15 cooperatively form the first surface 101 of the first lower plastic part 10. Along the length direction of the first lower plastic part 10, the third surface 151 is located at one end of the second surface 112. Along the length direction of the first lower plastic part 10, the fourth surface 141 is located at one end of the second surface 112 away from the third surface 151.

In this embodiment, the protrusion 15 includes a block 153 and two side blocks 154. The block 153 is a rectangular block. The two side blocks 154 are disposed at opposite ends of the block 153 along the width direction (Y-axis direction) of the first lower plastic part 10. One end of the two side blocks 154 is fixed to the block 153, and the other end of the two side blocks 154 extends toward the protruding platform 14 along the length direction (X-axis direction) of the first lower plastic part 10. The block 153 and the two side blocks 154 cooperatively form a U-shaped structure. In this embodiment, the protrusion 15 and the main part 11 may be made of same materials.

In this embodiment, the block 153 defines a plurality of grooves 16. Each groove 16 is recessed into the block 153 from the protrusion surface 152 along the thickness direction (Z-axis direction) of the first lower plastic part 10. The groove 16 includes a second bottom wall 161, and a first groove sidewall 162 and a second groove sidewall 163 disposed opposite to each other along the length direction (X-axis direction) of the first lower plastic part 10. A surface of the second bottom wall 161 facing the interior of the groove 16 is a bottom wall surface of the groove 16; a surface of the first groove sidewall 162 facing the interior of the groove 16 is the first wall surface of the groove 16; and a surface of the second groove side wall 163 facing the interior of the groove 16 is the second wall surface of the groove 16. The first wall surface and the second wall surface are located opposite to each other and spaced apart along the length direction of the first lower plastic part 10. The groove 16 also includes two groove end walls located opposite to each other along the width direction (Y-axis direction) of the first lower plastic part 10. The groove 16 is defined in the corresponding region of the block 153, which can save the materials of the first lower plastic part 10, thus is conducive to saving the manufacturing cost, and also reduce the weight of the first lower plastic part 10, which is conducive to a lightweight design of the energy storage device 1000.

It can be understood that the groove 16 is located at one end in the length direction of the first lower plastic part 10, the opening of the groove 16 is disposed on the first surface 101, the concave portion 13 is located at another end in the length direction of the first lower plastic part 10, the opening of the concave portion 13 is disposed on the first surface 101.

Specifically, along the thickness direction (Z-axis direction) of the first lower plastic part 10, the orthographic projection of the groove 16 on the third surface 151 coincides exactly with the orthographic projection of the block 153 on the third surface 151, or, the orthographic projection of the groove 16 on the third surface 151 is located within the orthographic projection of the block 153 on third surface 151; it can be understood that the outline of the groove 16 is the same as or similar to the outer outline of the block 153.

The groove 16 defines a plurality of strengthening ribs 164. The plurality of the strengthening ribs 164 protrude from the second bottom wall 161 and connected between the first groove sidewall 162 and the second groove sidewall 163. Along the width direction (Y-axis direction) of the first lower plastic part 10, equivalently, the plurality of the strengthening ribs 164 are fixedly connected to the bottom wall surface of the groove 16, and fixedly connected between the first wall surface and the second wall surface. Along the width direction (Y-axis direction) of the first lower plastic part 10, the plurality of the strengthening ribs 164 are sequentially spaced apart. The plurality of the strengthening ribs 164 are arranged separately and divide the groove 16 into a plurality of stream guidance slots 165. Along the width direction (Y-axis direction) of the first lower plastic part 10, the plurality of the stream guidance slots 165 are arranged sequentially. The plurality of the strengthening ribs 164 may enhance the strength of the groove 16. Specifically, in this embodiment, the quantity of the strengthening ribs 164 is five, and the five strengthening ribs 164 divide the groove 16 into six stream guidance slots 165 of equal volume. The slot sidewalls of the stream guidance slots 165 are actually formed by the slot sidewalls of the groove 16, the slot end walls of the groove 16, and the plurality of the strengthening ribs 164.

The first lower plastic part 10 defines a plurality of stream guidance holes 166. The plurality of the stream guidance holes 166 are defined on the second bottom wall 161 of the groove 16. The stream guidance hole 166 penetrates along the thickness direction (Z-axis direction) of the first lower plastic part 10 through both sides of the second bottom wall 161 of the groove 16 set facing away from each other along the thickness direction. The plurality of the stream guidance holes 166 are spaced apart along the length direction of the groove 16. Specifically, in this embodiment, the stream guidance holes 166 are arranged within the stream guidance slots 165; the quantity of the stream guidance holes 166 is 6, and each stream guidance slot 165 is defined within a stream guidance hole 166, and each stream guidance hole 166 penetrates through a slot bottom wall of the stream guidance slot 165. In the process of liquid injection or use, the stream guidance hole 166 is capable of transferring the electrolyte splashed onto the main surface 111 of the first lower plastic part 10, to flow through the groove 16, and then flow through the plurality of the stream guidance holes 166, and then flow back into the electrode assembly 200 by flowing through the stream guidance holes 166, realizing the reflux and reuse of the electrolyte, so as to prevent the electrolyte from retaining the main surface 111 of the first lower plastic part 10, and to avoid the electrolyte from spattering on the main surface 111 and the groove 16 of the first lower plastic part 10, and improving the wettability of the electrode assembly 200. A hole wall of the stream guidance hole 166 is set to be inclined, and a hole diameter of the stream guidance hole 166 gradually becomes smaller in the direction along the first surface 101 toward the second surface 112, i.e., the hole wall of the stream guidance hole 166 is inclined to form a guiding inclined plane.

It can be understood that in the present embodiment, the hole wall of the stream guidance hole 166 forms the guiding inclined plane, so that when the energy storage device 1000 is shaken or inverted, etc., causing the electrolyte to splash to the second bottom wall 161 of the groove 16, or causing the electrolyte to splash to the main surface 111 of the first lower plastic part 10 and flow into the groove 16, the electrolyte can flow back into the electrode assembly 200 under the action of the guiding inclined plane formed by the hole wall of the stream guidance hole 166, improving the wettability of the electrode assembly 200, avoiding that the electrolyte stays on the main surface 111 or into the groove 16 of the first lower plastic part 10 and is unable to participate in the electrochemical reaction, and thus avoiding from causing a waste of the electrolyte.

In addition, the injection mold of the lower plastic part 30 is conical convex column at a position corresponding to the stream guidance hole 166, so that when the lower plastic part 30 is demolding from the injection mold, the conical convex column separates in a direction away from the lower plastic part 30, and the outer peripheral surface of the conical convex column can be separated from the hole wall of the stream guidance hole 166 of the lower plastic part 30 in a split second, avoiding the conical convex column from contacting with the hole wall of the stream guidance hole 166 during a process of withdrawing from the stream guidance hole 166, resulting in a pulling of the lower plastic part 30, and therefore, the yield of injection molding of the lower plastic part 30 is improved, and the production cost is reduced.

The lower plastic part 30 is produced by an injection molding process, in which a molten plastic liquid melted at a high temperature is injected into a mold cavity through an injection port of a mold (not shown in the drawings), and after the molten plastic liquid fills the mold cavity, when the temperature of the molten plastic liquid at the high temperature decreases so that the molten plastic liquid is solidificated and molded, the mold is demolded to obtain the lower plastic part 30. The surface of the lower plastic part 30 is formed with an injection portion, which corresponds to a position of the injection port of the mold from the perspective of the mold.

It should be noted that in order to improve the injection efficiency, the mold is usually provided with mold cavities for simultaneous molding of a plurality of first lower plastic parts 10, and the mold cavities of the plurality of first lower plastic parts 10 are arranged in a matrix. Each cavity in the mold is correspondingly provided with an injection port. When the plastic liquid is injected into the mold, the plastic liquid first enters a main flow channel of the plastic liquid in the mold, and then the plastic liquid diverts and flows separately to the injection ports of the mold cavities of the plurality of first lower plastic part 10, and passes through the injection ports into the interior of the mold cavities. In order to make it possible to inject the plastic liquid into the mold cavities of the plurality of first lower plastic part 10 arranged in a matrix, the main flow channel is higher than the mold cavities of the plurality of the first lower plastic part 10, so as to facilitate that the plastic liquid can flow vertically downwardly into the mold cavities of the plurality of the first lower plastic part 10 after being diverted from the main flow channel.

Referring back to FIGS. 4 and 5, in this embodiment, the first lower plastic part 10 includes a first injection molding part 17 and a second injection molding part 18.

In this embodiment, the first injection molding part 17 is disposed between the two adjacent stream guidance holes 166 in the groove 16. The first injection molding part 17 includes a first opening end 171 and a first injection molding protrusion 172.

The first opening end 171 is defined at the third surface 151. Along the thickness direction of the first lower plastic part 10, an orthographic projection of the first opening end 171 on the first surface 101 at least partially covers an orthographic projection of a strengthening rib 164 on the first surface 101. It can be understood that the first opening end 171 corresponds to one strengthening rib 164, specifically, the first opening end 171 corresponds to an outermost strengthening rib 164 in the groove 16. In this embodiment, the first opening end 171 is a groove, caused by the shrinkage of the plastic liquid at the injection port as it cools and solidifies. During the injection molding process of the first lower plastic part 10, the first opening end 171 corresponds to the injection port of the mold.

It should be noted that during the injection molding process of the first opening end 171, the first opening end 171 corresponds to the injection port of the mold cavity of the first lower plastic part 10. In other embodiments, when the plastic is molded in the mold, if there is a slight excess of plastic, protrusion will be formed at the injection port, i.e., the first opening end 171 is protrusion; if there is a slight shortage of plastic, groove will be formed at the injection port, i.e., the first opening end 171 is groove. For the case that the first opening end 171 is the protrusion, the protrusion can be remained, or the protrusion can be cut or polished off after demolding, then the protrusion will not be left on the final product, and the first opening end 171 will form a flat structure that is flush with the rest of the product, and the roughness of the flat structure formed by the first opening end 171 is different from the roughness of the third surface 151.

The first injection molding protrusion 172 protrudes from the second bottom wall 161 of the groove 16, i.e., the first injection molding protrusion 172 protrudes from the bottom wall surface of the groove 16. Along the thickness direction (Z-axis direction) of the first lower plastic part 10, the first injection molding protrusion 172 and the first opening end 171 correspond to each other, and an orthographic projection of the first injection molding protrusion 172 on the first surface 101 covers an orthographic projection of the first opening end 171 on the first surface 101. The first injection molding protrusion 172 is located between the second bottom wall 161 of the groove 16 and the strengthening rib 164 corresponding to the first opening end 171, it being understood that the strengthening rib 164 corresponding to the first opening end 171 is connected via the first injection molding protrusion 172 to the second bottom wall 161 of the groove 16, and the first injection molding protrusion 172 is connected to the strengthening rib 164 corresponding to the first opening end 171. Along the thickness (Z-axis direction) of the first lower plastic part 10, the height h1 of the first injection molding protrusion 172 is 0.25 mm to 0.45 mm, which corresponds to the height h1 of the first injection molding protrusion 172 satisfying 0.25 mm≤h1≤0.45 mm.

In other embodiments, the first opening end 171 may also be disposed at the second surface 112 of the main part 11 simply so that the first opening end 171 and the first injection molding protrusion 172 are located correspondingly along the thickness direction (Z-axis direction) of the first lower plastic part 10.

In this embodiment, the second injection molding part 18 is located at the side of any of the second sub-bottom walls 1312 close to the first sub-bottom wall 1311. Along the width direction (Y-axis direction) of the first lower plastic part 10, the second injection molding part 18 and the first injection molding part 17 are located at the same side of the first lower plastic part 10. The second injection molding part 18 includes a second opening end 181 and a second injection molding protrusion 182.

The second opening end 181 is located on the fourth surface 141. Along the thickness direction of the first lower plastic part 10, the orthographic projection of the second opening end 181 on the first surface 101 at least partially covers an orthographic projection of a step on the first surface 101. It can be understood that the second opening end 181 corresponds to one step. Specifically, in this embodiment, the second opening end 181 is groove, which is caused by shrinkage of the plastic liquid at the injection port as it cools and solidifies. During the injection molding process of the first lower plastic part 10, the second opening end 181 corresponds to the injection port of the mold.

It should be noted that during the injection molding process of the first lower plastic part 10, the second opening end 181 corresponds to the injection port of the mold cavity of the first lower plastic part 10. In other embodiments, when the plastic is molded in the mold, if there is a slight excess of plastic, protrusion be formed at the injection port, i.e., the second opening end 181 is protrusion; if there is a slight shortage of plastic, groove will be formed at the injection port, i.e., the second opening end 181 is groove. For the case that second opening end 181 is the protrusion, the protrusion can be remained, or the protrusion can be cut or polished off after demolding, then the protrusion will not be left on the final product, and the second opening end 181 will form a flat structure that is flush with the other portions, and the roughness of the planar structure formed by the second opening end 181 is different from the roughness of the fourth surface 141.

The second injection molding protrusion 182 protrudes from one second sub-bottom wall 1312, i.e., the second injection molding protrusion 182 protrudes from the bottom wall surface of the concave portion 13. Along the thickness direction (Z-axis direction) of the first lower plastic part 10, the second injection molding protrusion 182 corresponds to the second opening end 181, and an orthographic projection of the second injection molding protrusion 182 on the first surface 101 covers an orthographic projection of the second opening end 181 on the first surface 101. The second injection molding protrusion 182 is connected to a step corresponding to the second opening end 181. Along the thickness direction (Z-axis direction) of the first lower plastic part 10, the height of the second injection molding protrusion 182 is 0.25 mm to 0.45 mm, which corresponds to the height of the second injection molding protrusion 182 h2 satisfying 0.25 mm≤h2≤0.45 mm.

In other embodiments, the second opening end 181 may also be formed on the second surface 112 of the main part 11 simply so that the second opening end 181 and the second injection molding protrusion 182 correspond along the thickness direction (Z-axis direction) of the first lower plastic part 10.

It is noted that in other embodiments, along the thickness direction (Z-axis direction) of the first lower plastic part 10, the first opening end 171 may also correspond to another strengthening rib 164 at the outermost side in the groove 16; the second opening end 181 may also correspond to a step between another second sub-bottom wall 1312 and the first sub-bottom wall 1311.

Referring back to FIGS. 4 and 5, in this embodiment, the first lower plastic part 10 further includes a first anti-overflow groove 191 and a second anti-overflow groove 192. The first anti-overflow groove 191 is disposed on the third surface 151. Along the thickness direction (Z-axis direction) of the first lower plastic part 10, the first anti-overflow groove 191 is recessed in the third surface 151. Along the thickness direction of the first lower plastic part 10 (Z-axis direction), the depth d1 of the first anti-overflow groove 191 is 0.32 mm to 0.52 mm, which is equivalent to that the depth d1 of the first anti-overflow groove 191 satisfies the requirement of $0.32\ mm \leq d1 < 0.52\ mm$. The first anti-overflow groove 191 surrounds the first opening end 171, and the first anti-overflow groove 191 is located at one side of the first opening end 171 toward the third surface 151 and is connected to the first opening end 171. The first anti overflow groove 191 is recessed in the third surface 151. Along the thickness direction (Z-axis direction) of the first lower plastic part 10, an orthographic projection of the first opening end 171 on the first surface 101 is located within an orthographic projection of the first anti-overflow groove 191 on the first surface 101.

The second anti-overflow groove 192 is defined on the fourth surface 141. Along the thickness direction (Z-axis direction) of the first lower plastic part 10, the second anti-overflow groove 192 is recessed in the fourth surface 141. Specifically, the second anti-overflow groove 192 is recessed in one of the second sub-surfaces 1412. Along the thickness direction (Z-axis direction) of the first lower plastic part 10, the depth d2 of the second anti-overflow groove 192 is 0.32 mm~0.52 mm, which is equivalent to that the depth d2 of the second anti-overflow groove 192 satisfies $0.25\ mm \leq h1 \leq 0.45\ mm$. The second anti-overflow groove 192 surrounds the second opening end 181 and the second anti-overflow groove 192 is located at one side of the second opening end 181 facing the fourth surface 141 and is connected to the second opening end 181. The second anti-overflow groove 192 is recessed in the fourth surface 141. Along the thickness direction (Z-axis direction) of the first lower plastic part 10, an orthographic projection of the second opening end 181 on the first surface 101 is located within an orthographic projection of the second anti-overflow groove 192 on the first surface 101.

It can be understood that in this embodiment, the first anti-overflow groove 191 is defined on the third surface 151, and the first anti-overflow groove 191 surrounds the first opening end 171, avoid that when the plastic is molded in the mold, and the first opening end 171 is a protruding plastic rod (i.e., protrusion), the sharp cracks of the plastic rod scratches the main part of the core or the lugs of the core, which may cause an internal short circuit of the energy storage device 1000. The second anti-overflow groove 192 is defined on the fourth surface 141, and the second anti-overflow groove 192 surrounds the second opening end 181, so as to avoid that when the plastic is molded in the mold, and the second opening end 181 is a protruding plastic rod (i.e., protrusion), the sharp cracks of the plastic rod scratches the main part of the core or the lugs of the core, which may cause an internal short circuit of the energy storage device 1000.

In addition, in this embodiment, since the first opening end 171 and the second opening end 181 are located on the third surface 151 and the fourth surface 141 respectively, the injection ports in the mold correspond to the location of the first opening end 171 and the second opening end 181, so that the plastic liquid can flow vertically downward through the injection ports in the mold cavity of the first lower plastic part 10 after diverting the plastic liquid from the main flow channel. Compared to defining the opening end part on the side wall of the first lower plastic part 10, the location of the injection port corresponds to the location of the opening end part, and the plastic liquid can flow vertically downward from the main flow channel to reach the height where the injection port is located, and then needs to go through a right-angle corner and then enters the mold cavity from the side of the first lower plastic part 10 through the injection port, that is to say, the side of the first lower plastic part 10 needs to be reserved for a sufficient length of the channel so that the plastic liquid can enter the mold cavity through the injection port. In the embodiment of the present disclosure, there is no need to reserve a channel for the flow of plastic liquid between the mold cavities of the two adjacent first lower plastic parts 10, i.e., the distance between the mold cavities of the two adjacent first lower plastic parts 10 can be smaller, and the matrix arrangement of the mold cavities for the first lower plastic parts 10 can be designed to be more compact, i.e., more mold cavities for the first lower plastic parts 10 can be arranged in the mold per unit area, and the quantity of the first lower plastic parts 10 molded in one injection molding can be more, and thus enhancing the production efficiency of the first lower plastic part 10.

The first opening end 171 and the second opening end 181 are located on the third surface 151 and the fourth surface 141, respectively, and the positions of the injection ports in the mold correspond to the positions of the first opening end 171 and the second opening end 181, respectively, i.e., the first opening end 171 and the second opening end 181 correspond to the two injection ports, respectively, after plastic liquid flow into the mold cavity of the first lower plastic part 10, plastic liquid has a larger channel space along the thickness direction of the first lower plastic part 10, and a plurality of diversion paths can be set along the thickness direction of the first lower plastic part 10, which can enhance the diversion efficiency of the plastic liquid in the mold cavity of the first lower plastic part 10, and thus enhance the productivity of the first lower plastic part 10.

In addition, corresponding to the first injection molding protrusion 172, the mold cavity of the first lower plastic part 10 is correspondingly defined with an injection concave portion for molding the first injection molding protrusion 172. Since the location of one injection port in the mold corresponds to the location of the first opening end 171, the one injection concave portion in the mold cavity corresponds to the injection port at the location of the first opening end 171. When the plastic liquid enters the mold cavity of the first lower plastic part 10 through one of the injection ports, the injection concave portion corresponding to the first injection molding protrusion 172 can provide a receiving space so that the plastic liquid that enters the mold cavity of the first lower plastic part 10 through one of the injection ports can be accumulated in the mold cavity of the first lower plastic part 10, and then directly diverted to the surrounding area, which improves the diversion efficiency of the first lower plastic part 10, and further improves the production efficiency of the first lower plastic part 10, and further avoids the plastic liquid, after entering the mold cavity through one injection port, from crashing into the injection port directly opposite the cavity wall and splashing back to the outside of the mold cavity, affecting the efficiency of the plastic liquid filling the cavity. Moreover, the plastic liquid can be quickly dispersed to other areas through the flow channel in the area where the strengthening rib 164 (when injecting the plastic liquid, the strengthening rib is the flow channel) is located, which further improves the efficiency of the plastic liquid flow, and thus shortens the injection molding time.

Corresponding to the second injection molding protrusion 182, the mold cavity of the first lower plastic part 10 is correspondingly defined with another injection concave portion for molding the second injection molding protrusion 182. Since the location of another injection port in the mold corresponds to the location of the second opening end 181, the another injection concave portion in the mold cavity corresponds to the another injection port at the location of the second opening end 181. When the plastic liquid enters the mold cavity of the first lower plastic part 10 through the another injection port, the another injection concave portion corresponding to the second injection molding protrusion 182 can provide a receiving space so that the plastic liquid that enters the mold cavity of the first lower plastic part 10 through the another injection port can be accumulated in the mold cavity of the first lower plastic part 10, and then directly diverted to the surrounding area, which improves the diversion efficiency of the first lower plastic part 10, and further improves the production efficiency of the first lower plastic part 10, and further avoids the plastic liquid, after entering the mold cavity through the another injection port, from crashing into the another injection port directly opposite the cavity wall and splashing back to the outside of the mold cavity, affecting the efficiency of the plastic liquid filling the cavity.

The first injection molding part 17 and the second injection molding part 18 are located at two opposite ends of the first lower plastic part 10 along the length direction of the first lower plastic part 10, the plastic liquid can flow into the mold cavity of the first lower plastic part 10 from the injection ports corresponding to the location of the first injection molding part 17 and the second injection molding part 18 respectively, it can flow, along the length direction of the first lower plastic part 10, from the two ends of the first lower plastic part 10 to the middle of the first lower plastic part 10, and the cavity corresponding to the main part 11 can be set with a longer channel, thereby enhancing the length of the flow channel of the plastic liquid, and further enhancing the production efficiency of the first lower plastic part 10, and avoiding the provision of complex flow channels with a large number of corners, which affects the flow rate of the plastic liquid.

In addition, in this embodiment, the first anti-overflow groove 191 is recessed in the third surface 151, the first anti-overflow groove 191 surrounds the first opening end 171, and the second anti-overflow groove 192 is recessed in the fourth surface 141, and the second anti-overflow groove 192 surrounds the second opening end 181, and the plastic liquid enters the mold cavity from the injection ports corresponding to the locations of the first opening end 171 and the second opening end 181, and the plastic liquid can flow directly along the thickness direction of the first lower plastic part 10; after entering the mold cavity from the injection port corresponding to the location of the opening end, the plastic liquid does not need to go through the right-angled corners and bends immediately to form the protrusion 15 and the protruding platform 14, so that the plastic liquid can flow more smoothly, and the plastic liquid with high speed flow at the liquid inlet is avoided from hitting the mold and causing damage to the mold, increasing the service life of the mold and reducing the production cost of the first lower plastic part 10.

Figure 7A:
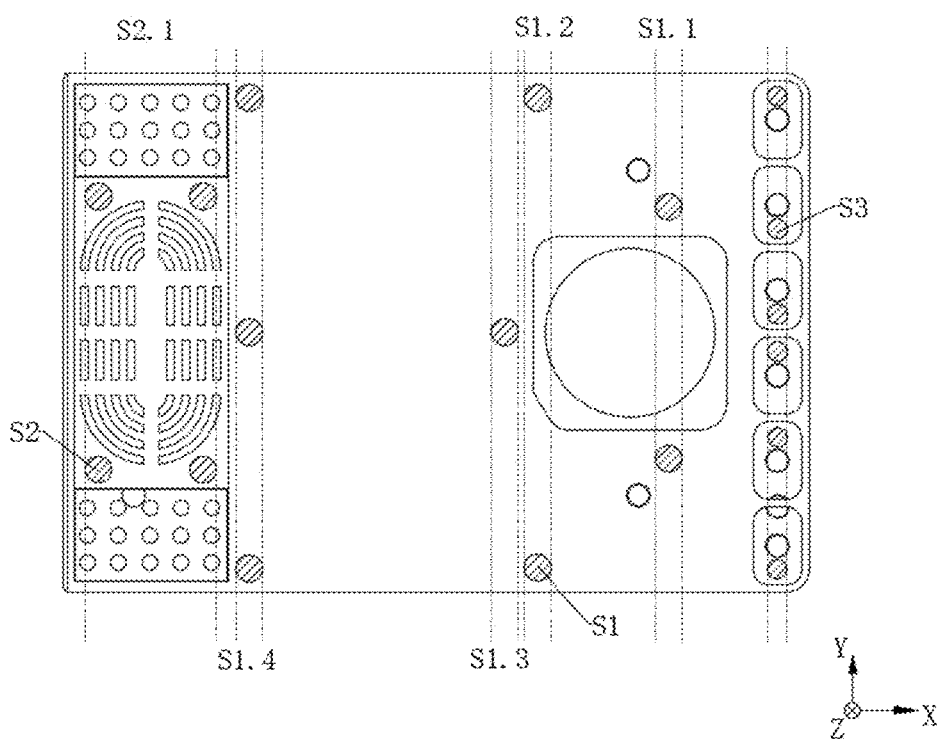
FIG. 7a illustrates a structural view of the first lower plastic part shown in FIG. 4 at a third angle, where the second and third groups of second ejector pin parts are omitted.
Figure 7B:
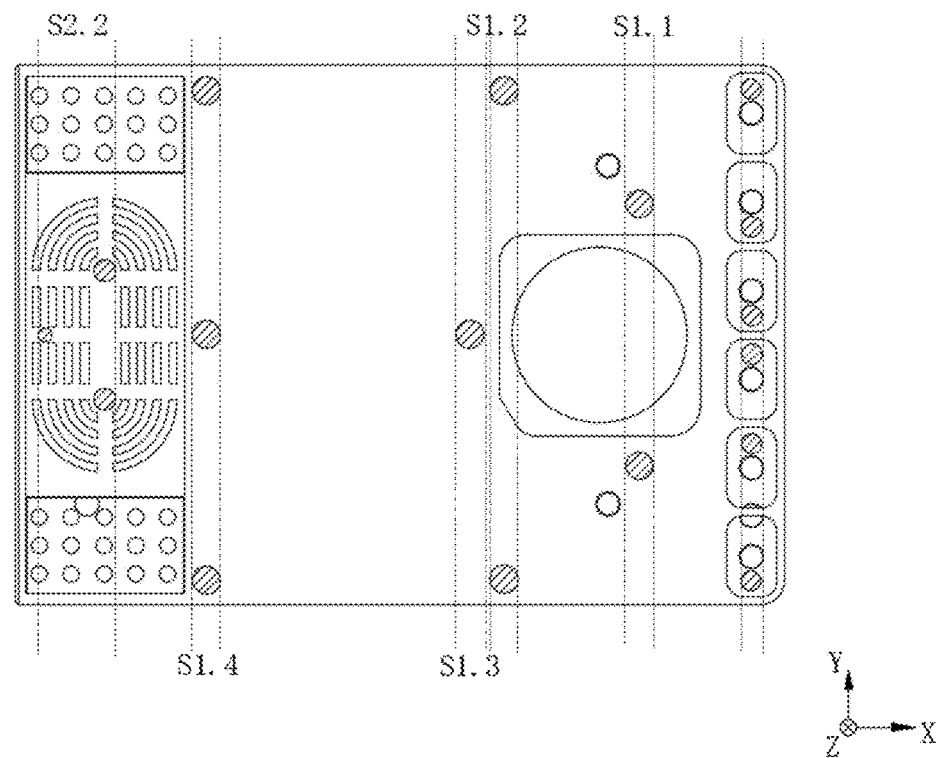
FIG. 7b illustrates a structural view of the first lower plastic part shown in FIG. 4 at the third angle, where the first and third groups of second ejector pin parts are omitted.
Figure 7C:
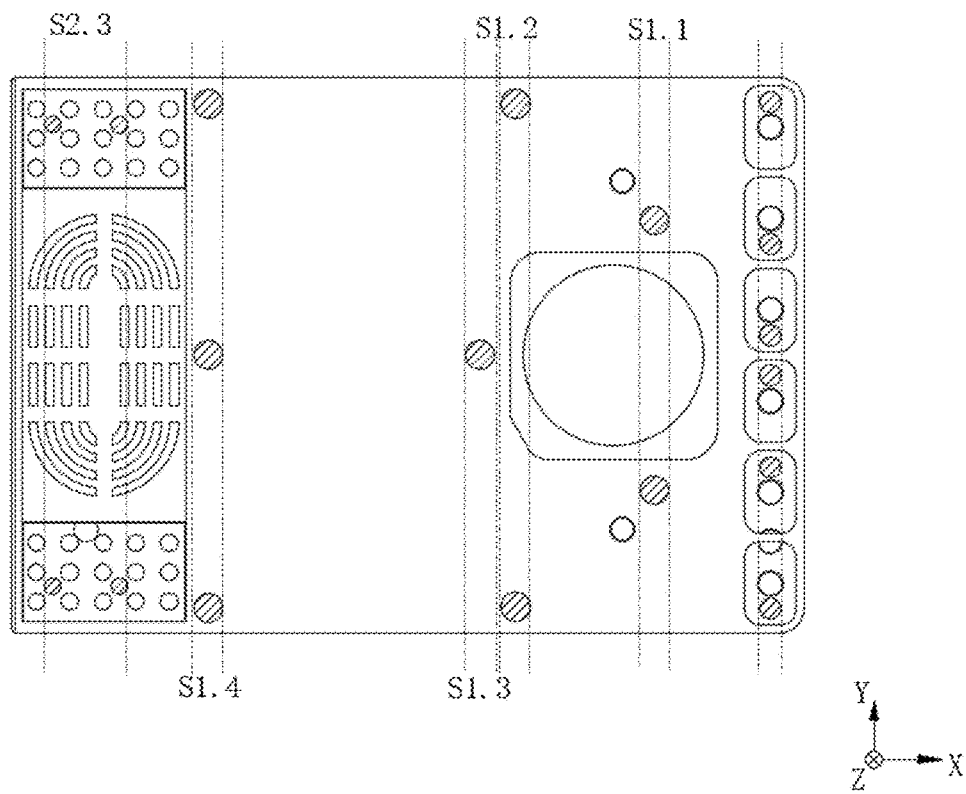
FIG. 7c illustrates a structural view of the first lower plastic part shown in FIG. 4 at the third angle, where the first and second groups of second ejector pin parts are omitted.

Referring to FIGS. 7*a*, 7*b*, and 7*c*, FIG. 7*a* illustrates a structural view of the first lower plastic part shown in FIG. 4 at a third angle, where the second and third groups of second ejector pin parts are omitted; FIG. 7*b* illustrates a structural view of the first lower plastic part shown in FIG. 4 at the third angle, where the first and third groups of second ejector pin parts are omitted; FIG. 7*c* illustrates a structural view of the first lower plastic part shown in FIG. 4 at the third angle, where the first and second groups of second ejector pin parts are omitted. In this embodiment, the first lower plastic part 10 is provided with a plurality of first ejector pin parts S1, a plurality of second ejector pin parts S2, and a plurality of third ejector pin parts S3. The plurality of first ejector pin parts S1 are disposed on the main surface 111 of the main part 11, and is located between the concave portion 13 and the groove 16. The plurality of the first ejector pin parts S1 are spaced apart from each other. The plurality of the second ejector pin parts S2 are disposed on a bottom wall surface of the first bottom wall 131 of the concave portion 13 and are spaced apart from each other. The plurality of the third ejector pins parts S3 are disposed on a bottom wall surface of the second bottom wall 161 of the groove 16 and are spaced apart from each other. The plurality of the first ejector pin parts S1, the plurality of the second ejector pin parts S2, and the plurality of the third ejector pin parts S3 are symmetrical with respect to a center line in the width direction of the first lower plastic part 10. The plurality of ejector pin portions are positions where ejector pins (not shown in the figures) are pressed against the first lower plastic part 10 after the first lower plastic part 10 has been molded in the mold to push the molded first lower plastic part 10 out of the mold for demolding. The center line is a straight line extending along the length direction (X-axis direction) of the first lower plastic part 10 and located in the middle of the width direction (Y-axis direction) of the first lower plastic part 10, and the center line is a virtual line for the purpose of presentation, and is not a line that actually exists on the first lower plastic part 10.

It should be noted that in the embodiment of the present disclosure, the ejector pin portion is a final product structure of the first lower plastic part 10, and is formed by the ejector pin applying an ejector force to the main surface 111 of the main part 11. The first lower plastic part 10 may not have the ejector portion formed when the ejector pin has not yet made contact with the first lower plastic part 10, i.e., when the demolding operation has not yet been performed. Of course, in some embodiments, a structure with an ejector pin portion may also be provided when demolding has not been performed, i.e., when the ejector pin is not yet in contact with the first lower plastic part 10, the structure with the ejector pin portion is formed on the first lower plastic part 10.

In this embodiment, the plurality of the first ejector pin parts S1 are disposed on the main surface 111 of the main part 11. The plurality of the first ejector pin parts S1 are divided into a plurality of groups. Each group includes at least one first ejector pin part S1, and the first ejector pin parts S1 in each group are spaced apart and symmetrical with respect to a center line along the width direction (Y-axis direction) of the first lower plastic part 10. The quantity of the first ejector pin parts S1 in each group may be odd or even. Specifically, when the quantity of the first ejector pin parts S1 in one group is an odd number, along the width direction (Y-axis direction) of the first lower plastic part 10, one of the first ejector pin parts S1 is located at the center line and is symmetrical with respect to the center line; the remaining first ejector pins S1 are equally distributed on both sides of the center line and is symmetric with respect to the center line. When the quantity of first ejector pin parts S1 in one group is an even number, along the width direction (Y-axis direction) of the first lower plastic part 10, all the first ejector pin parts S1 are equally distributed on both sides of the center line and are symmetrical with respect to the center line two by two. Exemplarily, the first ejector pin parts S1 in the first group S1.1 is 2, the first ejector pin parts S1 in the second group S1.2 is 2, the first ejector pin parts S1 in the third group S1.3 is 1, and the first ejector pin parts S1 in the fourth group S1.4 is 3.

The two first ejector pin parts S1 in the first group S1.1 are distributed on opposite sides of the pole through hole 113 along the width direction (Y-axis direction) of the first lower plastic part 10. The two first ejector pin parts S1 in the second group S1.2 are distributed on both edges of the main part 11 along the width direction of the first lower plastic part 10. The first ejector pin part S1 in the third group S1.3 is distributed on a side of the retaining protrusion 12 facing away from the groove 16. The three first ejector pin parts S1 in the fourth group S1.4 are distributed on a side of the concave portion 13 close to the retaining protrusion 12, and the three first ejector pin parts S1 are arranged separately along the width direction (Y-axis direction) of the first lower plastic part 10, and two of the first ejector pin parts S1 are located at two edges of the main part 11 along the width direction of the first lower plastic part 10.

It can be understood that the first ejector pin parts S1 of the first group S1.1 and the first ejector pin part S1 of the third group are both distributed at the side edges of the retaining protrusion 12, and the two first ejector pin parts S1 of the first group S1.1 and the first ejector pin part S1 of the third group S1.3 are arranged in a triangular arrangement. The three first ejector pin parts S1 at the apex of the triangle can play a core role of uniform demold. In view of the large resistance when the retaining protrusion 12 is demolded from the mold, and the setting of the pole through hole 113 making the retaining protrusion 12 easy to be damaged when it is demolded from the mold, three first ejector pin parts S1 arranged in a triangular shape on the side of the retaining protrusion 12 are set to provide the demolding stability of the retaining protrusion 12.

The opposite ends of the main part 11 along the length direction, the opposite sides of the main part 11 along the width direction, and the side edges of the retaining protrusion 12 are all provided with the first ejector pin parts S1, and the plurality of the first ejector pins parts S1 are evenly distributed, so that when the first ejector pin parts S1 contact the main part 11, the ejector pins can apply a uniform ejection force to the main part 11, thereby allowing uniform demolding. The plurality of ejector pins synchronously contact with positions of the plurality of the first ejector pin parts S1 on the main surface 111 of the main part 11 and move synchronously, so that the main surface 111 is subjected to the ejector force of the ejector pins at the same time, and the force is more uniform, so as to avoid the problem of deformation of the main part 11 caused by the non-uniformity of ejector force, which is conducive to improving the uniformity of the demolding of the main part 11, and thus improving the injection yield of the first lower plastic part 10.

Figure 8:
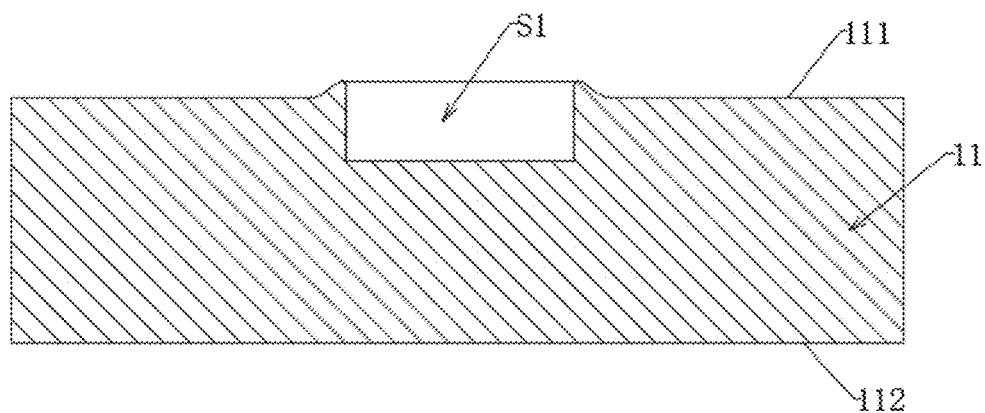
FIG. 8 illustrates a partial cross-sectional view of the first lower plastic part shown in FIG. 4.

Referring to FIG. 8, FIG. 8 illustrates a partial cross-sectional view of the first lower plastic part shown in FIG. 4. The first ejector pin part S1 has a crater shape, with a middle part concave with respect to the main surface 111 and an edge protruding from the main surface 111. The first ejector pin part S1 includes a push surface, which is a surface formed by recessing the middle part of the first ejector pin part S1 into the main surface 111, with the push surface facing the main surface 111 along the thickness direction (Z-axis direction) of the first lower plastic part 10. The push surface has a circular shape. Specifically, when the plastic has not cooled to room temperature during injection molding and demolding, the ejector pins contact the main surface 111 and apply ejector force to the main surface 111, the pressure of the ejector pins acts on the main surface 111, to eject a depression in the plastic, and the plastic on the outside of the ejector pin is squeezed by the plastic of the depressed portion and buckles from the outside periphery of the ejector pin, and in this way, a crater-shaped first ejector pin part S1 is formed. It can be understood that when the ejector pin is in contact with the main surface 111 and the ejector force is applied, the ejector pin is in contact with the push surface. The second ejector pin part S2 and the third ejector pin part S3 are similar in shape to the first ejector pin part S1, which all have crater shapes, and the push surfaces of the second ejector pin part S2 and the third ejector pin part S3 are also circular, which will not be discussed later.

In the embodiments of the present disclosure, the crater shape of the first ejector pin part S1 is slightly concave with respect to the main surface 111, and the depth of the concavity is negligible with respect to the thickness of the main part 11 (the dimension of the main part 11 in the Z-axis direction), and the specific depth of the concavity is not limited, and the rim of the crater shape is also slightly protruded with respect to the main surface 111, and the height of its protrusion is negligible compared to the thickness of the main part 11, and the specific height of the protrusion is not limited. In this way, the setting of the first ejector pin part S1 does not adversely affect the structural strength of the main part 11, nor does it affect the function of the first lower plastic part 10.

Referring to FIG. 7a, FIG. 7b and FIG. 7c together, in this embodiment, the plurality of second ejector pin parts S2 are distributed on the first sub-bottom wall 1311 and two second sub-bottom walls 1312 of the concave portion 13, and the plurality of second ejector pin parts S2 are symmetrical with respect to a center line. The plurality of second ejector pin parts S2 are divided into three groups, namely, a first group S2.1, a second group S2.2, and a third group S2.3. The quantity of the second ejector pin parts S2 in the first group S2.1 is four, and the four second ejector pin parts S2 of the first group S2.1 are disposed at the four top corners of the first sub-bottom wall 1311, and the four second ejector pin parts S2 are symmetrical with respect to the center line. The quantity of the second ejector pin parts S2 in the second group S2.2 is three, and two of the three second ejector pin parts S2 are distributed at the joint of the first strip reinforcement 1313 and the second strip reinforcement 1314, and the two second ejector pin parts S2 are symmetrical with respect to the center line; the other second ejector pin part S2 is distributed on the side of the second strip reinforcement 1314 away from the retaining protrusion 12 and is located at the center line, and is symmetrical with respect to the center line. The quantity of the second ejector pin parts S2 in the third group S2.3 is four, two of the four second ejector pin parts S2 are disposed on one second sub-bottom wall 1312, each of the two second ejector pin parts S2 is located between the four airflow holes 1315, and the two second ejector pin parts S2 are spaced apart along the length direction of the first lower plastic part 10; the other two of four second ejector pin parts S2 are disposed on the other second sub-bottom wall 1312, and each of the two second ejector pin part S2 is located between four second airflow holes 1315, and the two second ejector pin parts S2 are spaced apart along the length direction of the first lower plastic part 10. The four second ejector pin parts S2 of the third group S2.3 are symmetrical two by two with respect to the center line.

It can be understood that the four second ejector pin parts S2 of the first group S2.1 are located at the four top corners of the first sub-bottom wall 1311, which can make the four top corners of the first sub-bottom wall 1311 uniformly subjected to a force during demolding; the two second ejector pin parts S2 of the second group S2.2 are located at the joint of the first strip reinforcement 1313 and the second strip reinforcement 1314, and one second ejector pin part S2 of the second group S2.2 is located at the center line, which can make the first sub-bottom wall 1311 uniformly subjected to a force as a whole, to avoid damage to the first sub-bottom wall 1311 due to high resistance when the first sub-bottom wall 1311 is demolded. The four second ejector pin parts S2 of the third group S2.3 are located on the two second sub-bottom walls 1312, and the four second ejector pins parts S2 of the third group S2.3 are symmetrical, so that force applied to the two second sub-bottom walls 1312 is relatively balanced when being demolded, avoiding deformation of the two second sub-bottom walls 1312 due to unbalanced force.

Referring to FIG. 7a, in this embodiment, the plurality of the third ejector pin parts S3 are located on the second bottom wall 161 of the groove 16. Each stream guidance slot 165 is provided with a third ejector pin part S3. The plurality of the third ejector pins parts S3 are spaced apart and symmetrical with respect to the center line along the width direction (Y-axis direction) of the first lower plastic part 10. Specifically, the quantity of the third ejector pin parts S3 is six, where two third ejector pin parts S3 are located at a side of the outermost two stream guidance holes 166 away from the center line, and the two third ejector pin parts S3 are symmetrical with respect to the center line; two third ejector pin part S3 are located at a side of the middle two stream guidance holes 166 close to the center line, and the two third ejector pin parts S3 are symmetrical with respect to the center line; the other two third ejector pin parts S3 are located at a side of the inside two stream guidance holes 166 close to the center line, and the two third ejector pin parts S3 are symmetrical with respect to the center line.

It can be understood that by providing the third ejector pin part S3 at the second bottom wall 161 of each stream guidance slot 165 of the groove 16, when the groove 16 is demolded as a whole using the third ejector pin parts S3, the plurality of the third ejector pins parts S3 can uniformly apply an ejector force to each stream guidance slot 165, avoiding that the stream guidance slot 165 cannot be uniformly demolded due to a large demolding resistance of the stream guidance slot 165.

It can be understood that by providing the plurality of the ejector pin portions on the first lower plastic part 10 and making the plurality of the ejector pin portions symmetrical with respect to the center line, the first lower plastic part 10 can be pushed out of the injection mold uniformly, and the first lower plastic part 10 is subjected to a uniform ejector force as a whole to demold the mold uniformly, avoiding the first lower plastic part 10 from bending, twisting and other deformations due to uneven cooling. At the same time, the first lower plastic part 10 of the embodiments of the present disclosure can be ejected after injection molding, and does not need to be completely cooled down to room temperature in the mold before being demolded, thus improving the production efficiency.

The above disclosure is only a preferred embodiment of the present disclosure, which of course cannot be used to limit the scope of the present disclosure. A person of ordinary skill in the art can understand that all or part of the process for realizing the above embodiment, and equivalent changes made in accordance with the claims of the present disclosure, still fall within the scope of the present disclosure.

What is claimed is:

1. A lower plastic part, configured for an end cover assembly of an energy storage device, wherein the lower plastic part comprises a first surface and a second surface, the first surface and the second surface are disposed facing away from along a thickness direction of the lower plastic part;

wherein the lower plastic part defines a groove, a stream guidance hole, a concave portion, a plurality of first ejector pin parts, a plurality of second ejector pin parts and a plurality of third ejector pin parts, the groove is defined at one end of the lower plastic part along a length direction of the lower plastic part, a bottom wall surface of the groove protrudes from the second surface and an opening of the groove is disposed in the first surface, the stream guidance hole penetrates through a bottom wall of the groove, a hole diameter of the stream guidance hole is progressively smaller along a direction from the first surface to the second surface, the concave portion is defined at the other end of the lower plastic part along the length direction of the lower plastic part, and a bottom wall surface of the concave portion protrudes from the second surface, and an opening of the concave portion is disposed in the first surface;

wherein the plurality of the first ejector pin parts are disposed on the first surface, located between the groove and the concave portion, and spaced apart from each other; the plurality of the second ejector pin parts are disposed on the bottom wall surface of the concave portion, and spaced apart from each other; the plurality of the third ejector pin parts are disposed on the bottom wall surface of the groove, and spaced apart from each other; the plurality of the first ejector pin parts, the plurality of the second ejector pin parts and the plurality of the third ejector pin parts are all symmetrical with respect to a center line of the lower plastic part in a width direction;

wherein the lower plastic part further comprises a third surface, the third surface is located at one end of the second surface along the length direction of the lower plastic part, the third surface is located at one side of the groove facing away from the first surface along the thickness direction of the lower plastic part, an orthographic projection of the groove on the third surface is located within the third surface, the lower plastic part also comprises a first injection molding part, the first injection molding part comprises a first opening end, the first opening end is disposed in the third surface; the first opening end is corresponding to an injection port of a mold;

wherein the first injection molding part further comprises a first injection molding protrusion; the first injection molding protrusion protrudes from the bottom wall surface of the groove; along the thickness direction of the lower plastic part, an orthographic projection of the first injection molding protrusion on the first surface covers the orthographic projection of the first opening end on the first surface;

wherein the lower plastic part further comprises a fourth surface, the fourth surface is located at one end of the second surface away from the third surface along the length direction of the lower plastic part, the fourth surface is located at one side of the concave portion facing away from the first surface along the thickness direction of the lower plastic part, and an orthographic projection of the concave portion on the fourth surface is located within the fourth surface;

wherein the lower plastic part further comprises a second injection molding part, the second injection molding part comprises a second opening end, the second opening end is disposed in the fourth surface; the second opening end is corresponding to another injection port of the mold;

wherein the concave portion comprises a first sub-bottom wall and two second sub-bottom walls; along the width direction of the lower plastic part, the two second sub-bottom walls are located on opposite sides of the first sub-bottom wall, two steps are formed between the two second sub-bottom walls and the first sub-bottom wall;

wherein along the thickness direction of the lower plastic part, an orthographic projection of the second opening end on the first surface at least partially covers an orthographic projection of one of the two steps on the first surface.

2. The lower plastic part according to claim 1, wherein the groove has a first wall surface and a second wall surface, the first wall surface and the second wall surface are disposed opposite to each other and spaced apart along the length direction of the lower plastic part;

the lower plastic part further comprises a plurality of strengthening ribs, the plurality of the strengthening ribs are fixedly connected to the bottom wall surface of the groove, and fixedly connected between the first wall surface and the second wall surface, the plurality of the strengthening ribs are spaced apart in sequence along the width direction of the lower plastic part;

along the thickness direction of the lower plastic part, an orthographic projection of the first opening end on the first surface at least partially covers an orthographic projection of one of the plurality of strengthening ribs on the first surface.

3. The lower plastic part according to claim 2, wherein the lower plastic part further defines a first anti-overflow groove; the first anti-overflow groove is recessed in the third surface and connected to the first opening end; the first anti-overflow groove surrounds the first opening end; along the thickness direction of the lower plastic part, the orthographic projection of the first opening end on the first surface is located within an orthographic projection of the first anti-overflow groove on the first surface.

4. The lower plastic part according to claim 3, wherein along the thickness direction of the lower plastic part, a depth d1 of the first anti-overflow groove satisfies: 0.32 mm≤d1≤0.52 mm.

5. The lower plastic part according to claim 2, wherein the first injection molding protrusion is connected one of the plurality of the strengthening ribs.

6. The lower plastic part according to claim 2, wherein along the thickness direction of the lower plastic part, a height h1 of the first injection molding protrusion satisfies: 0.25 mm≤h1≤0.45 mm.

7. The lower plastic part according to claim 2, wherein the lower plastic part further comprises a second anti-overflow groove, the second anti-overflow groove is recessed in the fourth surface and connected to the second opening end, the second anti-overflow groove surrounds the second opening end, along the thickness direction of the lower plastic part, the orthographic projection of the second opening end on the first surface is located within an orthographic projection of the second anti-overflow groove on the first surface.

8. The lower plastic part according to claim 7, wherein along the thickness direction of the lower plastic part, a depth d2 of the second anti-overflow groove satisfies: 0.32 mm≤d2≤0.52 mm.

9. The lower plastic part according to claim 7, wherein the second injection molding part further comprises a second injection molding protrusion; the second injection molding protrusion protrudes from the bottom wall surface of the concave portion, along the thickness direction of the lower plastic part, an orthographic projection of the second injection molding protrusion on the first surface covers the orthographic projection of the second opening end on the first surface, the second injection molding protrusion is connected to one of the two steps.

10. The lower plastic part according to claim 9, wherein along the thickness direction of the lower plastic part, a height h2 of the second injection molding protrusion satisfies: 0.25 mm≤h2≤0.45 mm.

11. An end cover assembly, wherein comprising an end cover, an explosion-proof valve and a lower plastic part;

the lower plastic part comprises a first surface and a second surface, the first surface and the second surface are disposed facing away from along a thickness direction of the lower plastic part;

wherein the lower plastic part defines a groove, a stream guidance hole, a concave portion, a plurality of first ejector pin parts, a plurality of second ejector pin parts and a plurality of third ejector pin parts, the groove is defined at one end of the lower plastic part along a length direction of the lower plastic part, a bottom wall surface of the groove protrudes from the second surface and an opening of the groove is disposed in the first surface, the stream guidance hole penetrates through a bottom wall of the groove, a hole diameter of the stream guidance hole is progressively smaller along a direction from the first surface to the second surface, the concave portion is defined at the other end of the lower plastic part along the length direction of the lower plastic part, and a bottom wall surface of the concave portion protrudes from the second surface, and an opening of the concave portion is disposed in the first surface;

wherein the plurality of the first ejector pin parts are disposed on the first surface, located between the groove and the concave portion, and spaced apart from each other; the plurality of the second ejector pin parts are disposed on the bottom wall surface of the concave portion, and spaced apart from each other; the plurality of the third ejector pin parts are disposed on the bottom wall surface of the groove, and spaced apart from each other; the plurality of the first ejector pin parts, the plurality of the second ejector pin parts and the plurality of the third ejector pin parts are all symmetrical with respect to a center line of the lower plastic part in a width direction;

wherein the lower plastic part further comprises a third surface, the third surface is located at one end of the second surface along the length direction of the lower plastic part, the third surface is located at one side of the groove facing away from the first surface along the thickness direction of the lower plastic part, an orthographic projection of the groove on the third surface is located within the third surface, the lower plastic part also comprises a first injection molding part, the first injection molding part comprises a first opening end, the first opening end is disposed in the third surface; the first opening end is corresponding to an injection port of a mold;

wherein the first injection molding part further comprises a first injection molding protrusion; the first injection molding protrusion protrudes from the bottom wall surface of the groove; along the thickness direction of the lower plastic part, an orthographic projection of the first injection molding protrusion on the first surface covers the orthographic projection of the first opening end on the first surface;

wherein the lower plastic part further comprises a fourth surface, the fourth surface is located at one end of the second surface away from the third surface along the length direction of the lower plastic part, the fourth surface is located at one side of the concave portion facing away from the first surface along the thickness direction of the lower plastic part, and an orthographic projection of the concave portion on the fourth surface is located within the fourth surface;

wherein the lower plastic part further comprises a second injection molding part, the second injection molding part comprises a second opening end, the second opening end is disposed in the fourth surface; the second opening end is corresponding to another injection port of the mold;

wherein the concave portion comprises a first sub-bottom wall and two second sub-bottom walls; along the width direction of the lower plastic part, the two second sub-bottom walls are located on opposite sides of the first sub-bottom wall, two steps are formed between the two second sub-bottom walls and the first sub-bottom wall;

wherein along the thickness direction of the lower plastic part, an orthographic projection of the second opening end on the first surface at least partially covers an orthographic projection of one of the two steps on the first surface;

along a thickness direction of the end cover assembly, the lower plastic part is laminated on one side of the end cover, and the first surface of the lower plastic part faces the end cover;

along the thickness direction of the end cover assembly, the explosion-proof valve is opposite to a bottom wall of the concave portion.

12. The end cover assembly according to claim 11, wherein the groove has a first wall surface and a second wall surface, the first wall surface and the second wall surface are disposed opposite to each other and spaced apart along the length direction of the lower plastic part;

the lower plastic part further comprises a plurality of strengthening ribs, the plurality of the strengthening ribs are fixedly connected to the bottom wall surface of the groove, and fixedly connected between the first wall surface and the second wall surface, the plurality of the strengthening ribs are spaced apart in sequence along the width direction of the lower plastic part;

along the thickness direction of the lower plastic part, an orthographic projection of the first opening end on the first surface at least partially covers an orthographic projection of one of the plurality of strengthening ribs on the first surface.

13. The end cover assembly according to claim 12, wherein the lower plastic part further defines a first anti-overflow groove; the first anti-overflow groove is recessed in the third surface and connected to the first opening end; the first anti-overflow groove surrounds the first opening end; along the thickness direction of the lower plastic part, the orthographic projection of the first opening end on the first surface is located within an orthographic projection of the first anti-overflow groove on the first surface.

14. The end cover assembly according to claim 13, wherein along the thickness direction of the lower plastic part, a depth d1 of the first anti-overflow groove satisfies: $0.32 \text{ mm} \leq d1 \leq 0.52 \text{ mm}$.

15. The end cover assembly according to claim 12, wherein the first injection molding protrusion is connected one of the plurality of the strengthening ribs.

16. The end cover assembly according to claim 12, wherein along the thickness direction of the lower plastic part, a height h1 of the first injection molding protrusion satisfies: $0.25 \text{ mm} \leq h1 \leq 0.45 \text{ mm}$.

17. The end cover assembly according to claim 12, wherein the lower plastic part further comprises a second anti-overflow groove, the second anti-overflow groove is recessed in the fourth surface and connected to the second opening end, the second anti-overflow groove surrounds the second opening end, along the thickness direction of the lower plastic part, the orthographic projection of the second opening end on the first surface is located within an orthographic projection of the second anti-overflow groove on the first surface.

18. The end cover assembly according to claim 17, wherein along the thickness direction of the lower plastic part, a depth d2 of the second anti-overflow groove satisfies: $0.32 \text{ mm} \leq d2 \leq 0.52 \text{ mm}$.

19. An energy storage device, comprising a housing, an electrode assembly and an end cover assembly according to claim 11, wherein the housing defines an opening, the housing defines an accommodating space, the electrode assembly is received in the accommodating space, the end cover assembly is mounted to the housing and covers the opening.

20. An electrical equipment, comprising an energy storage device according to claim 19, wherein the energy storage device is configured to store electrical energy.

* * * * *